United States Patent [19]
Hitchcock

[11] Patent Number: 5,803,739
[45] Date of Patent: Sep. 8, 1998

[54] TOTAL ENVIRONMENT DECORATING AID

[76] Inventor: Sherry Hitchcock, 1225 Yankee Jim Ct., Cool, Calif. 95614

[21] Appl. No.: 855,839

[22] Filed: May 12, 1997

[51] Int. Cl.$^6$ .................................................. G09B 25/00
[52] U.S. Cl. .............................................. 434/78; 434/430
[58] Field of Search ................................ 434/72, 78, 79, 434/80, 430

[56] References Cited

U.S. PATENT DOCUMENTS

| | | | |
|---|---|---|---|
| 926,436 | 6/1909 | Pearson | 434/79 |
| 1,202,586 | 10/1916 | Rindskopf | 434/78 |
| 1,246,076 | 11/1917 | Fairbanks | 434/79 |
| 1,738,398 | 12/1929 | Sesti | 434/78 |
| 1,832,250 | 11/1931 | Stephens | 434/78 |
| 2,259,436 | 10/1941 | Connor | 434/79 |
| 2,294,131 | 8/1942 | Raymond | 434/79 |
| 2,300,360 | 10/1942 | Remmers | 434/79 |
| 2,319,200 | 5/1943 | Bedell | 434/79 |
| 2,481,672 | 9/1949 | Kanaske | 434/79 |
| 2,506,894 | 10/1950 | Rowe | 434/430 |
| 3,277,591 | 10/1966 | Rutkofsky | 434/78 |
| 3,624,928 | 12/1971 | Felton | 434/198 |
| 3,994,079 | 11/1976 | Mirman | 434/80 |
| 4,250,642 | 2/1981 | Riehle | 434/79 |
| 4,403,000 | 9/1983 | Gates | 434/430 |
| 5,533,902 | 7/1996 | Miller | 434/428 |

Primary Examiner—Paul J. Hirsch
Attorney, Agent, or Firm—Mark C. Jacobs, Esq.

[57] ABSTRACT

A coordination kit for choosing suitable fabrics, paints, wall coverings, window treatments, fabrics for chairs etcetera, rugs and other floor coverings to achieve a desired decorator effect. The kit includes at least two nomographs, mounted to a substrate, and numbering up to a number equal to the number of elements of the total decoration effect that the user desires to choose. Each nomograph (nomogram), includes a rotatable upper layer having at least two windows, which overlies a lower layer having viewable segments, each of which segments has a plurality of cells, all of which cells contain a set of predetermined generally accepted color spectrum specimens, from either the entire color spectrum or a portion thereof, which specimens are used in the selection of the coordinated decorator effect desired. The specimens may be from but not limited to actual or photographic representations of tile, fabric, paint, rugs and other aspects of a room's decor.

23 Claims, 6 Drawing Sheets

TOTAL ENVIRONMENT DECORATING AID

FIELD OF THE INVENTION

This invention pertains to a device for coordination of colors, in textures and materials to achieve a particular overall decorating effect.

BACKGROUND OF THE INVENTION

In the early days of the do-it-yourself craze, homeowners were satisfied with being able to save money by carrying out such simple tasks as painting or staining rebuilt pine furniture or by buying precut lengths of wood and prepackaged nails for the creation of a home project. As the do-it-yourself craze matured to a way of life, so too the offerings to the do-it-yourselfer became more sophisticated. I have seen the development of the market for KD (knockdown) furniture grow from unfinished pine bookcases of yesteryear to the fully finished and ready for assembly in anything from 15 minutes for a simple bookcase to several hours for home theater consoles of today. Home Depot®, Home Base® and other large multi-unit stores now offer seminars on such topics as wallpaper, tile cutting and setting, concrete patio pouring and many other topics, the jobs of which formerly required skilled artisans.

Today's homeowner is not only interested in doing the individual project, but he/she is desirous of achieving an entire decorator effect for a particular room, area, garden/patio and the like. In order to achieve a total decorating effect, it is necessary to fully coordinate—not just pick—the paint on the wall from a series of chips. One needs to also choose the wallpaper, the floor coverings, the furniture and, for some persons, to even coordinate down to the bedspread and the sheets and the towels.

In order to achieve a desired decorator effect, it is necessary for the homeowner to become familiar with certain terms that are part of the jargon of the decorator industry, most notably those terms pertaining to color, texture and visual harmony. Unfortunately, most homeowners have minimal knowledge of any of these topics. In the area of color, harmony refers to such terms as compliments (complimentary), split complimentary and triad, all of which are fully understood by professional decorators.

It is therefore an object of this invention to provide a device for use by the homeowner, or the decorator as the case may be, to coordinate the various aspects of a project setting.

It is another object of this invention to provide a device having a plurality of nomographs mounted to a substrate, which device lays out for the user, the triad and complimentary colors of the key color(s) on the color wheel to be considered for achieving a particular decorator effect.

It is a further object to provide a device which presents to the user the ability to coordinate fabric, paint, wallpaper, rugs, woodwork and the like in a simple easy-to-use unit which can be placed on a table before them.

It is a yet further object to provide a means for the user to coordinate fabrics, textures and colors for the achievement of a particular decorator effect, all in a simple easy-to-use device.

It is a yet further object to provide a foldaway color wheel apparatus that serves as a learning tool for the user, to enable the user to coordinate colors and textures to achieve a desired decorator effect for a locale.

It is one further object to provide a tool for use by either the homeowner or decorator, to learn elements of color and coordination, from information provided by professional decorators, in a simple easy-to-use format utilizing preprogrammed information.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A coordination kit for use by homeowners and decorators for choosing suitable fabrics, paints, wall coverings, window treatments, rugs & other floor coverings to achieve a desired decorator effect. The kit includes nomographs, numbering at least two and up to a number equal to the number of elements of the total decoration effect that the user desires to choose. Each nomograph or nomogram as they are also referred to, has at series of at least two windows, each window of which contains a plurality of cells, which cells contain a series of predetermined generally accepted color specimens that are useful in the achievement of the decorator effect desired. The specimens can be real or photographic renditions of tile, fabric, paint and other aspects of the decor of a room.

DESCRIPTION OF THE PREFERRED EMBODIMENT

Figure 1:
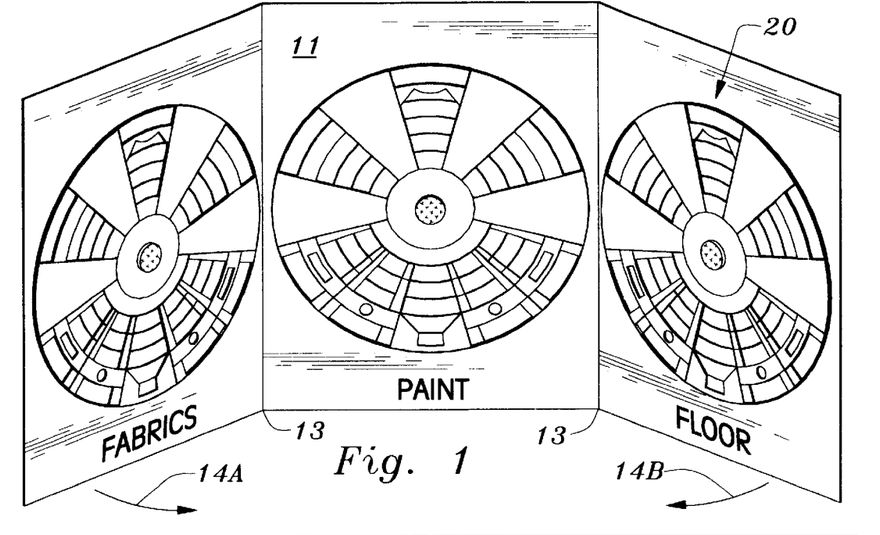
FIG. 1 is a perspective view of a tripartite coordination kit according to this invention.

In FIG. 1 there is shown a perspective view of a typical embodiment of this invention, 10. The invention comprises a plurality of color wheels fixedly or removably mounted to a substrate and containing viewable information pertaining to interior decorating.

Here in FIG. 1, three (3) color wheels or nomographs 20, are shown mounted to a substrate 11. Substrate 11 includes a pair of folds 13, seen in FIG. 1 and FIG. 6 which permit the inward folding of the outer panels, 11A, and 11C in accordance with the fold arrows 14A, 14B of FIG. 1 for easy flat storage.

Figures 2, 2A:
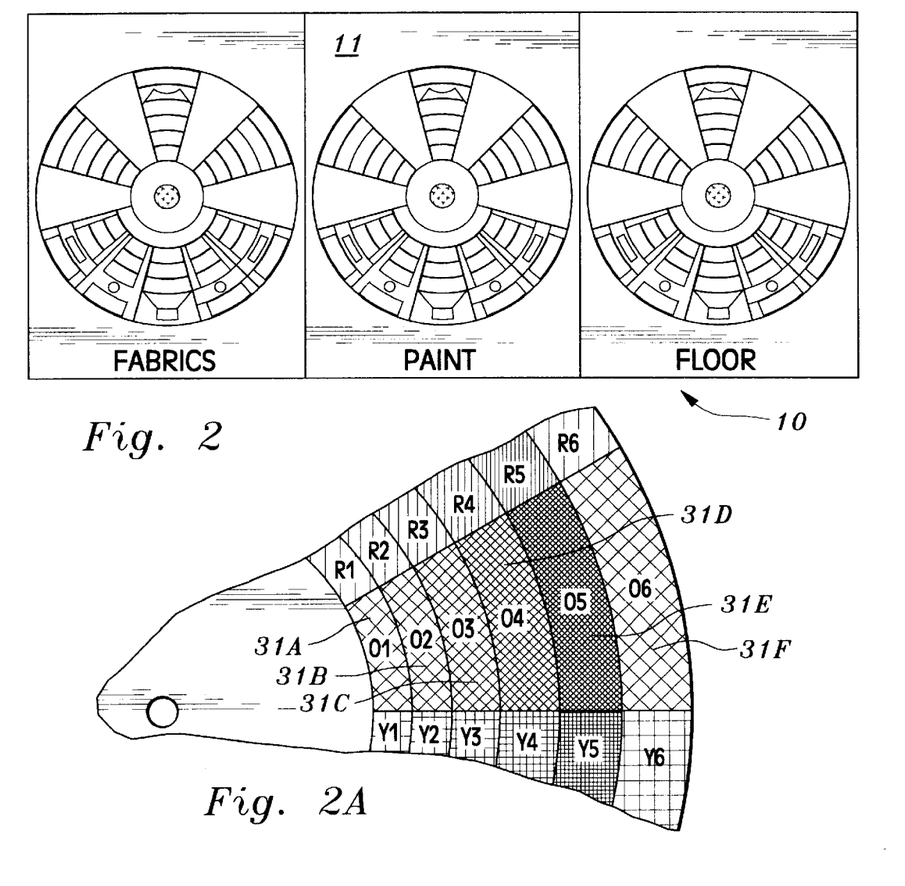
FIG. 2 is a top plan view of the coordination kit of FIG. 1.

In FIG. 2, the three panels 11A, 11B, and 11C are laid out flat in an extended open fashion ready for use.

Figure 3:
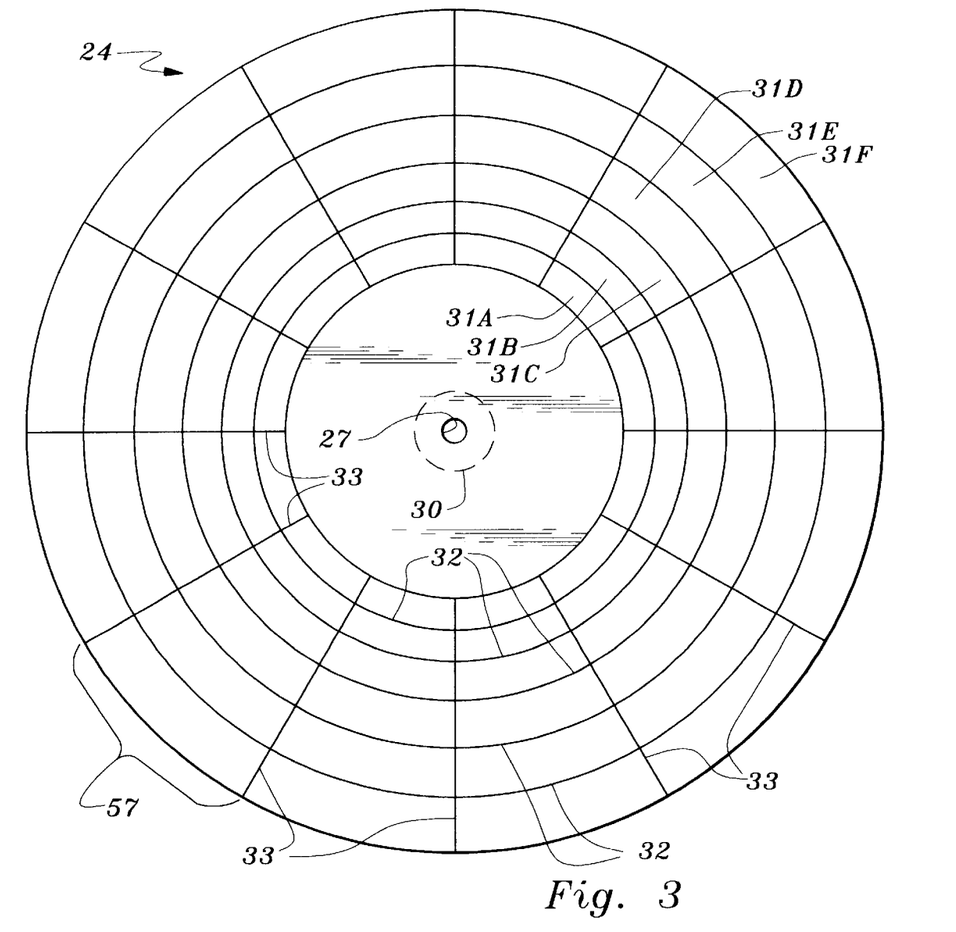
FIG. 3 is a top plan view of an inner layer of a typical rotatable nomograph forming part of this invention.

In FIG. 3, a nomograph inner layer 24 according to this invention is seen, but the discussion of the details thereon will be reserved until discussion of the structure has transpired.

Figure 4:
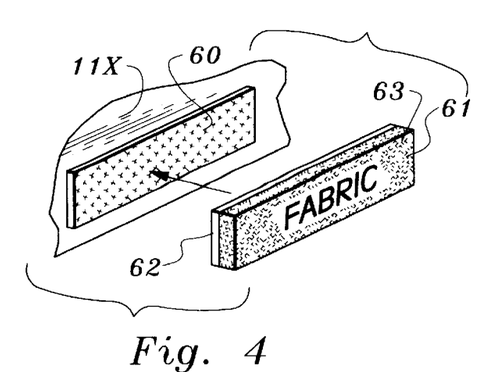
FIG. 4 is a closeup diagrammatic view which illustrates a first mode of applying identifying indicia for a particular nomograph to the substrate of this invention.
Figure 5:
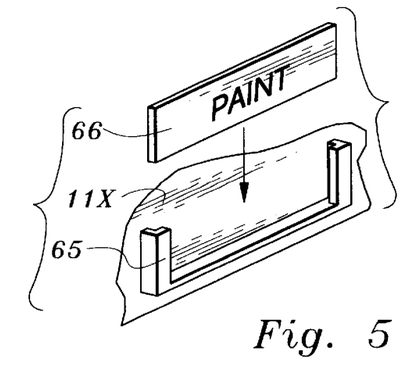
FIG. 5 is a closeup diagrammatic view which illustrates a second mode of applying identifying indicia for a particular nomograph to the substrate of this invention.

In FIGS. 4 and 5 exemplary panels 11X of a multipanel substrate are shown. Each of these panels shows a different mode of presenting information to the user of the invention. In FIG. 4, a self-adhesive hook and loop female strip 60 is adhered to the panel 11X. Then a tab 61 formed of a printed indicia bearing layer 63 adhered to a self-adhesive hook and loop male member 62,is releasably attached to strip 60.

In FIG. 5, a U-shaped slotted receiver 65 releasably retains a single layer plastic or cardstock printed stick 66, which also bears informational indicia about the relevant nomograph for the user. This indicia can be as generic as to the type of wheel it is, e.g. paint, wallpaper, rugs, linoleum, and the like, or range to a more specific indicator such as the name of a specific manufacturer of fabric, paint, or coordinating materials such as sheets and pillow cases.

Figure 6:
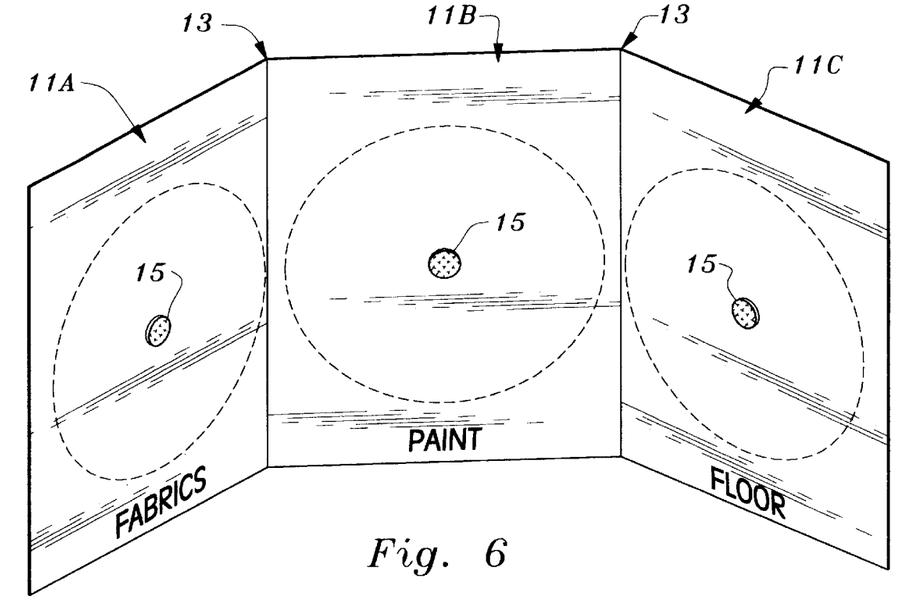
FIG. 6 is a top perspective view of the substrate portion of the coordination kit of FIG. 1.

FIG. 6 is a close-up perspective view of the substrate 11 showing the three individual panels 11A, B, and C, with the folds 13 in the format of a V-groove for the folding of the two outer panels inwardly as has been described with respect to FIG. 1. There is shown in this figure a series of spaced spots 15, one disposed in the center of each panel, for the retention of a respective individual nomograph. Such spots 15 may be of Velcro® or other loop and hook pile fabric with an adhesive layer on the under side. Spots of this nature are readily available in the marketplace.

Figure 7:
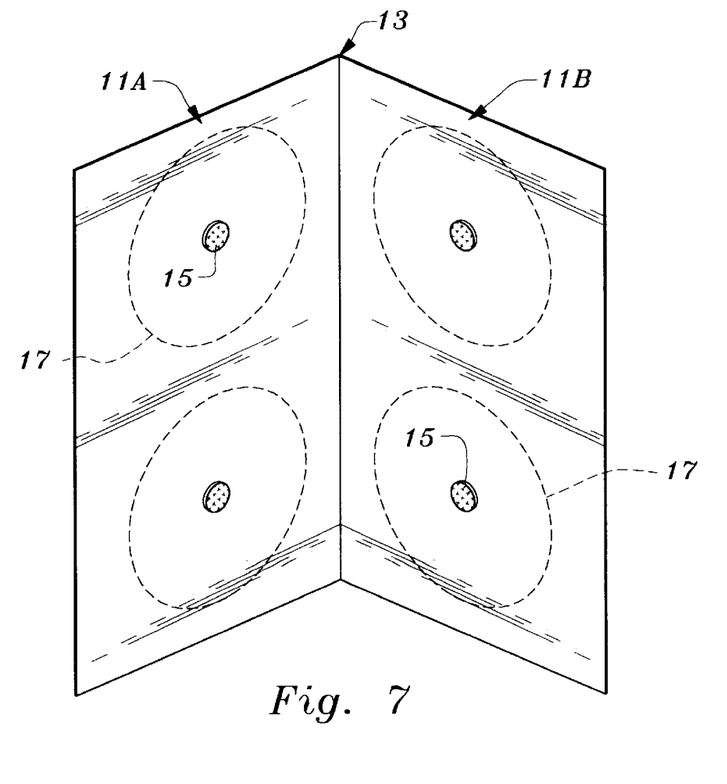
FIG. 7 is a top perspective view of a variant of the substrate shown in FIG. 6, which substrate is adopted to receive 4 nomographs used as a coordination kit according to this invention.
Figure 8:
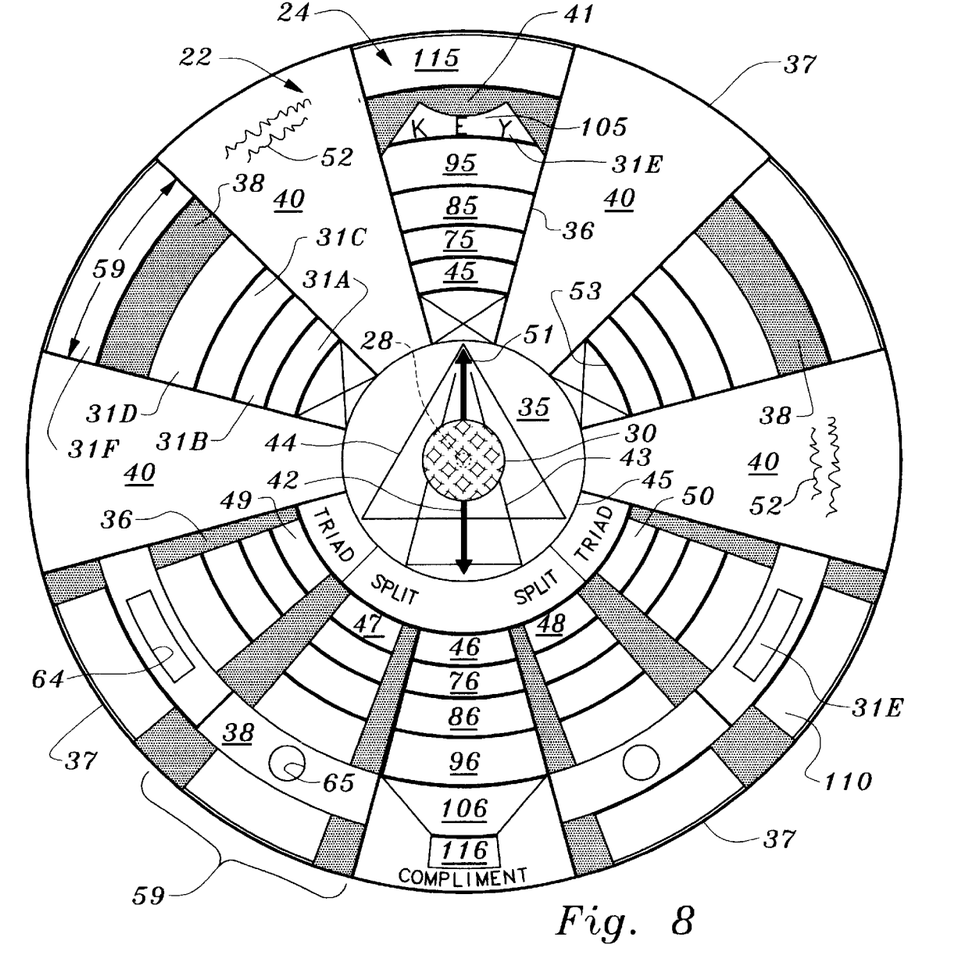
FIG. 8 is a top plan view of a typical nomograph forming part of this invention.

In FIG. 7 there is shown a variant of the invention. Here rather than have four adjacent single wheel panels, the support is divided only into two panels with two nomographs 20, such as shown in FIG. 3 or FIG. 8 to be attached thereon, one per spot 15. Also shown in this view but equally applicable for any layout employed is indicia 17. This indicia may be in the form of a solid, dashed, dotted or other circular line, slightly larger in cross section than the nomograph. This indicia line 17 serves as an alignment guide for the engagement of the hook and loop fastener for the respective color wheel to the substrate panel's spot 15.

Figure 9:
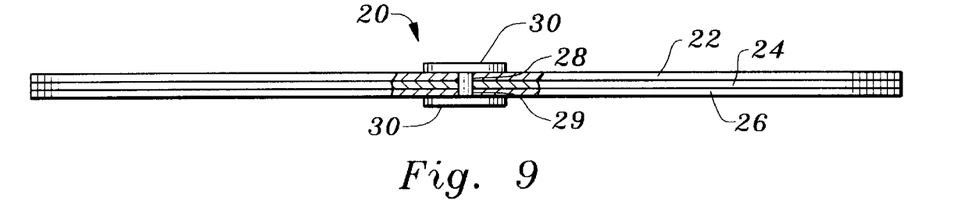
FIG. 9 is an elevational view illustrating a second embodiment of the construction of the nomograph of FIG. 8, ie. a double faced reversible nomograph, having three layers and also forming part of this invention.

FIG. 8 shows a typical nomograph configured as a circle and which has at least two layers and up to four layers as will be explained infra. Such nomographs 20 are shown in elevation in FIGS. 9 and 10. In FIG. 9 a three layer unit is shown, while in FIG. 10 a two layer unit is depicted. The graphic indicia of these is similar to that which will be discussed relevant to FIG. 3 and in the section of this application pertaining to the use and operation of the invention.

Figure 11:
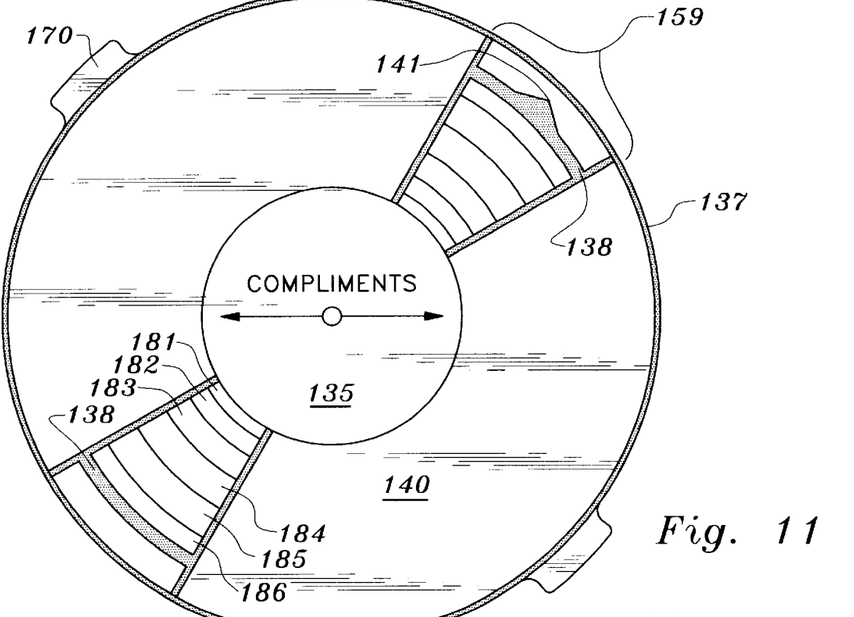
FIG. 11 is a top plan view illustrating a first variant of the viewable material of the nomograph found in FIG. 8.
Figure 12:
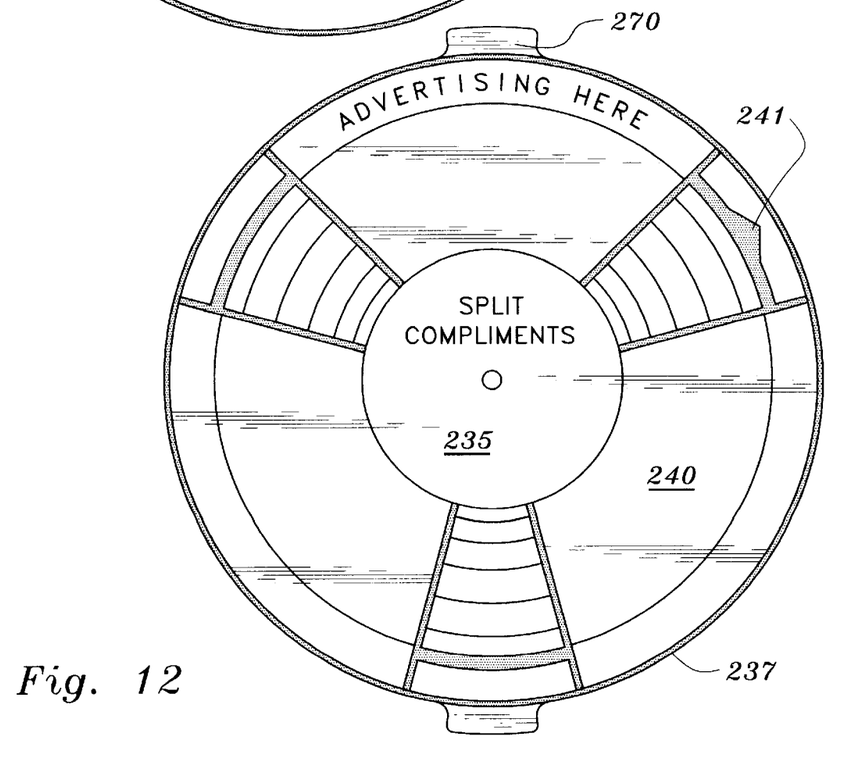
FIG. 12 is a top plan view illustrating a second variant of the viewable material of the nomograph found in FIG. 8.

In FIG. 9, and also in FIG. 8, the upper layer 22, also designates the first or viewing layer 22 as a rotatable wheel and is formed in the configuration of a wagon wheel with a central hub 35, with an assembly pin 28 therein, an outer circular peripheral member, 37, an inner circular stiffener member 38 intermediately disposed, spaced from the hub and also spaced from the peripheral member, and a series of spaced linear spokes 36, each of which is connected to the hub and to the inner stiffener member 38 and the peripheral member 37. The space between at least two spokes 36 is open at least in part thereby defining a window for viewing a viewable segment 57 of the lower layer. While six (6) is the minimum number of linear spokes to give rise to six (6) windows or viewing areas, to accommodate the necessary spacing of the windows of the compliments, split compliments and triads, 12 spokes for 12 windows is what is illustrated in the patent drawings at FIG. 8. Other higher numbers of windows, preferably in multiples of six (6) such as 18 or 24 windows may be employed as well. But a lesser number of spaces between spokes may be open for viewing as is illustrated in FIGS. 11 and 12 to be discussed infra. Also each viewable area 57 or segment of the lower layer per FIG. 3 can contain various numbers of cells, with 6 being illustrated in FIG. 8 per window and 6 in FIGS. 11 & 12 and 8 in FIG. 13. The spaces between the balance of the spokes are filled in and designated filler areas and designated 40 as discussed elsewhere herein.

Upper layer 22 also includes at least one, and as shown here, for filler sections 40 each of which filler sections is generally a pie shaped section capable of receiving indicia, 52, such as instructions, advertising, and other printed matter. By spacing the filler sections 40 one window apart, as in FIG. 8, the viewing eye is not bothered as much by the presence of other color windows adjacent the then operative window containing the key color being coordinated. Each filler section is formed of covering material 39 such as paper or cardstock on to which the designated indicia may be printed, and which is disposed between two spokes 36. The stiffener members 38 are of the same stock as the filler ran are die cut formed.

A pointer 41 is disposed on one segment of stiffener circular member preferably between the two filler sections such as to be able to point to the key color window. Here cell 115 et seq. in FIG. 8.

The hub 35 contains certain printed information which is important to the use of the invention. Reference is now made to FIG. 8. A double arrow line 42, which represents 180 degree opposite colors designate the location of the complimentary colors. These complimentary colors are opposite the key point, which is arbitrarily depicted as being diamond shaped 51 and at the setting as seen in FIG. 8 opposite cell locations 45 and 46.

Isosceles triangle 43 represents the triangle of the split complimentary colors. The split complimentary colors, are measured from the same key point or start point 51 on line 42 as the complimentary colors, specifically cell 45, but the legs of the triangle terminate at one cell to the left and one cell to the right of the complimentary colors.

The third triangle which is an equilateral triangle 44 also starts at the same key point, 51, at cell 45 with the two legs pointing to cells 49 and 50, which are each 2 cells from their respective side of the complimentary colors. For purposes of this invention, a "cell" such as 110 or the key cell 45, constitute one arc segment of a viewable area or section 57 of the lower layer and viewable in a window 59 (the area between two spokes) of the upper layer. Each window may contain gradations of the same color, either tones or shades. This could also be slighter more intense or less intense central or dominant color of fabric as may be desired. See also FIG. 3 and FIG. 13.

The lower layer 24 or 24' per FIG. 3 includes a plurality of bands or annuli such as 31A–F inclusive with each band having a plurality of cells adjacent each other side to side. Whereas each viewable area or section 57 constitutes a plurality of cells adjacent each other vertically speaking. Each window 59 ( which is open) overlies and is sized to conform to a single view area, 57 of the lower layer. See FIG. 8. Note also that stiffener 38 includes apertures 64 and 65 to permit viewing of cells there beneath.

In FIG. 8, which is lined for color, 5 variants of the same color—be it paint, fabric, wallpaper rug, linens, etcetera are employed. It is within the skill of the art to set forth a usable and desired number of cells per view area 57 depending on the diameter of the nomograph.

The terms "complimentary colors", "triad", and "split complimentary" are all well recognized terms in the art of color, be it in the environment of color photography, or the world of interior design, and as such no further explanation is required.

A contrast can be made between FIG. 3 and FIG. 8, in that in FIG. 3, the spokes 36 of the upper layer, are not seen, since the upper layer is not present. The series of cells that form any one particular view area 57 are segregated by lines of separation 32 and the separation spokes 33. The reader is asked to recognize also bands 33 and that lines 32 may be real or imaginary, as they merely represent a line of demarcation between any two adjacent cells of a viewable area 57, which in the case of fabric samples, might not include a distinct separation line, but rather only two adjacent edges of fabric swatches, or two pieces of linoleum. Whereas in FIG. 8 the spokes 36 of the upper layer are aligned with the separation spokes 33 of the middle layer 24, such that the separation spokes 33 are not visible. Notice also that when the spokes 36 and separation spokes 33 are aligned as in FIG. 8, and the start point diamond 51 is directed to the center of cell 45, the points of each triangle are in alignment with the center of each of their associated cells. Contrast FIG. 13.

The attention of the reader is called to the fact that while only one inner circular stiffener member 38, is depicted per FIG. 8, one or more circular bands of stiffener spaced outwardly from the hub, could also be present similar to element 38. The first layer 22 which has the window(s) 59 may be constructed of plastic or cardstock or other suitable material. The hub may be made of the same or different material. Disposed at the center of the hub is a Velcro tab 30. Second layer 24 previously discussed may be constructed of the same materials. Pin hole 27 is for pin 28.

As seen in FIGS. 9 and 3, the middle layer of wheel 20 is designated 24 and is formed of the series of concentric annuli such as 31A–F shown in FIG. 3 and 8. Each annulus is divided laterally into a number of cells, the exact number of which at a minimum is 6. The exact number will depend on the diameter of the wheel and the number of spacing of the spokes of the upper layer 22. In the embodiment shown in FIG. 8, there are a total of 6 annuli, designated 31A–31F, see also FIG. 3. Cell 47 bears the dual number 47 and 31A because the cell is 47 but the annulus within which it lies is the innermost annulus 31A. Thus it is seen that each information bearing layer 24 or 24' can have any number of annuli bands each of which can be divided into as many lateral cells as may be desired. The real limitation on the numbers lies in the practicality for ease of use. Specimens smaller than ½ inch by 1" become too difficult for most eyes to focus upon. Thus a practical range of 5 to 8 annuli and 6 to 18 cells per annulus is deemed easy to use.

Wheel 20 of FIG. 9 is a two sided wheel, in that colors, fabrics or whatever colored materials are chosen, is displayed on BOTH sides of the wheel. Therefore the lower outer layer 26 is structurally the same as upper layer 22 and accordingly, it need not be described any further. Of course, the content of each side of the middle layer 24 should preferably contain different samples. It is within the skill of the artisan to determine whether additional specimens of the same medium, e.g. paint should be on BOTH sides of the middle layer which contains the viewable areas, or whether one side should be such an arbitrary pick as tile colors, while the other side is linoleum patterns with a dominant color therein. The use of two sided middle layers, reduces the number of nomographs needed for a total decorating effect determination.

It has been indicated that a nomograph for use herein can range from 2 to 4 layers. Four is the maximum. In such an instance, the middle layer would be constructed not as a single two sided layer, as shown in FIG. 9, but rather as two single sided layers, each of which in the latter instance would be separately rotatable. It is believed that such a concept is so simple to grasp, that a separate figure to illustrate this point is unnecessary. However the presence of 4 layers as opposed to 3 might tend to make the folder structure too bulky for practicality.

A dual headed pin 28, or a sleeved pin or brass fastener may be employed to assemble the multiplicity of layers into an assemblage as per FIG. 9. Again this is within the skill of the art to accomplish, such that each layer is separately rotatable as may be desired. A second Velcro tab 30 is placed on the opposite center of the nomograph 20 to permit it to be placed with either the obverse or the reverse side up on a substrate panel as depicted in FIG. 6 for engagement with a spot 15.

Figure 10:
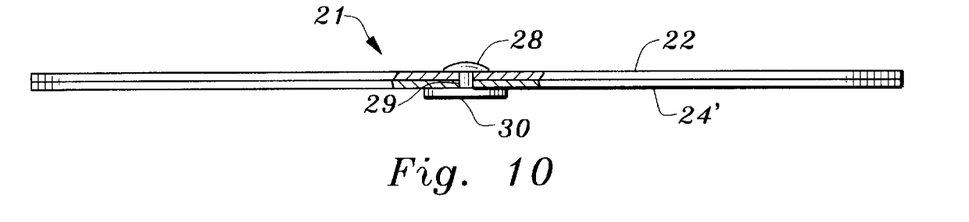
FIG. 10 is an elevational view of a two layer version of the configuration of the nomograph seen in FIG. 8.

In FIG. 10 the layer 24' is used to separately indicate that the specimen containing layer while similar to the layer 24 previously discussed at length, is but single sided. The upper layer is the same layer 22 previously defined. Thus pin 28 is uncovered as only the underside of layer 24' is to be removably secured to the panel such as 11B with a Velcro® tab. Such a nomograph is designated 21 rather than 20. Pin 28 passes through a series of aligned central apertures 29, in either version, to permit ready rotation of the upper and middle layers as may be desired.

The reader's attention is now turned toward FIG. 11. In this FIGURE and FIG. 12, like numbers of the last two digits, refer to like parts, but here the numbers will be in the 100 and 200 series. The differences in these two FIGURES lie not in the physical construction, i.e., FIG. 9 versus FIG. 10, but in the cosmetic appearance of the viewable material. Thus the outer perimeter is designated 137 in layer 22 of FIG. 11 and 237 in FIG. 12, while in the intermediate stiffener are 138 and 238 respectively. Each of the upper layers of these two versions include a pointer arrow 141 and 241 respectively mounted at the principle window on the intermediate band 138 and 238 respectively but oppositely disposed aesthetically from pointer arrow 41. Also added to these versions at convenient locations on the outer perimeter 137,237, are handle members 170, 270 for rotating the top layer relative to the layer below. In each of these, the covered over area 140, 240 is larger to permit only the viewing of the complimentary color material, be it tile, fabric or wall paper etc., in the version of FIG. 11 and to permit only the viewing of the split complimentary colored material be it drape colors, wood stains, or linoleum or for that matter tile, fabric or wall paper as the case may be.

Figure 13:
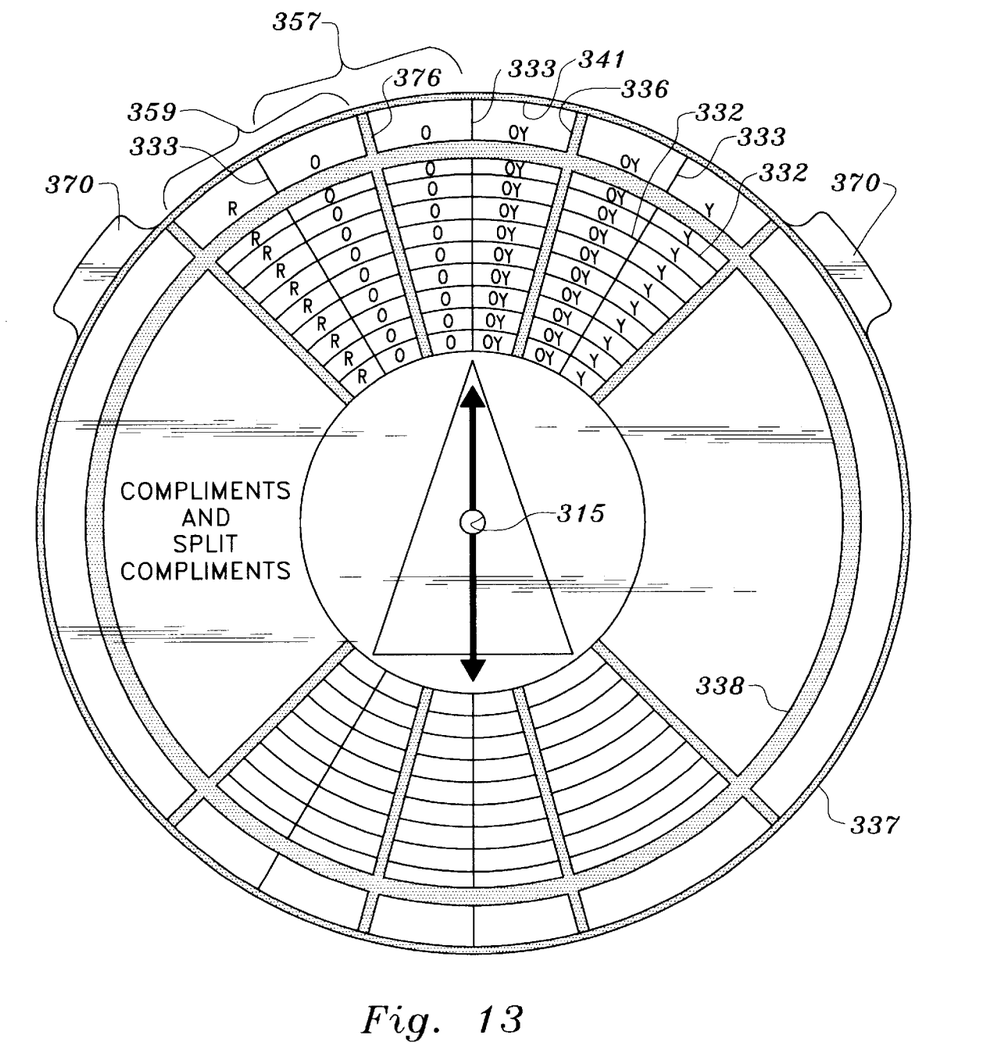
FIG. 13 is a top plan view of a third variant of the viewable material, wherein the upper and lower wheels are out of alignment.

Other variations of what is open and what is closed off from view lies within the skill of the person operating in this field. Thus one can envision the presence of three open windows side by side with the balance being covered over such as to view a family of adjacent colors such as red, orange and yellow orange, each in its own window varying in intensity from dark to light, as depicted in FIG. 13. Again, since like numbers in higher series refer to like parts further discussion of FIG. 13 is not necessary. However, it should be pointed out that the versions shown in FIGS. 11, 12, and 13 can be constructed single faced as in FIG. 10 or double faced as shown in FIG. 9.

The wheel depicted in FIG. 13 illustrates the presence as viewable areas 357 only compliment and split compliment colors. The bands have been denoted with R, O, OY and Y to indicated red, orange, orange yellow and yellow cells. Note how the upper layer spokes 336 are purposely shown out of alignment with the spokes of separation 333 of the lower layer. Thus orange and orange yellow appear on both sides of spoke 336 to illustrate the point. This view window 357 does not overlay viewable area 357. Note also the presence of triad colors on the nomograph for this wheel.

CONSTRUCTION AND OPERATION

The actual selection of the specimen samples of cloth, fabric tile, paint etc. for installation on a substrate for the preparation of the middle layers 24 and 24' of the invention 10, are within the skill of the art of the individual color specialist or the interior designer. That is, the interior decorator or other person would employ color chips of paint, samples of monochrome or patterned wall paper, actual or photographic renditions of linoleum patterns and tiles, fabric samples of or color photographic renditions of Venetian blinds & other window treatment materials, metal or wood chips of actual paneling, ad infinitum. First, a sketch would be made of the layer 24 with the various bands and the cells would be sized on each of the bands. Then one specimen would be placed in each cell area. A trained color specialist would lay out the individual specimens according to the colors of the rainbow, in adjacent view areas, with variations of shade and tint of the same basic color being within the next concentric annulus cell of the respective view area. These slight differences are often called value changes. (View area=pie shape segment; cell=1 location within the segment.)

It is also recognized that a plurality of materials could be used within a view area, all of the same color if desired. Thus a multi celled segment could include all purple cells of rug, sofa fabric, wall paint, pleated shade fabric and picture frame molding specimens. Then all lilac (a light purple) of the same materials could be in the adjacent segment.

It is further recognized that not every color need be generally represented, so long as the requirement of complimentary, split complimentary and triad are all present for each color present. Thus a nomograph could be based on a section of the spectrum such as just the "blues" and "greens", or limited solely to the "reds", but with the proviso that the complimentary, split complimentary and triads to the various reds are also present. Thus the requirement that the nomograph have at least 6 windows in order to accommodate the spatial separation within the spectrum of the triad and split complimentary as per FIG. 3 still stands. Though the preferred embodiment employs 12 windows, more windows are within the scope of the invention as are less as is seen from the drawings.

In addition to simple color wheels, there are many other themes that can be chosen for display on these middle layers. One possibility is to have a basic color such as a metallic, say bright brass, shiny brass, or chrome for a bathroom, and then build around it. Another possibility is to have a basic color of wood, such as rosewood, oak or walnut for furniture, and then build around that to find complimentary and related stains for floors and other decorations of the room.

Specimens may, as noted earlier, be actual color chips as received from a paint manufacturer, actual samples of fabric, bits of tile, wood veneers, cuts of linoleum or photographic reproductions of any and all of these, and any other aspects of a room's decor.

It is thus seen that a myriad of middle layer wheels are all possible, all within the skill of the color artisan to create. The commonality of all nomographs of these kits are the fact that the upper wheel rotates while the lower is fixed.

While not actually necessary, it may prove desirable to create a middle layer template by drawing the windows and cells on the cardstock, prior to application of the actual specimens rather than merely doing the geometry and pasting or otherwise applying the specimens to the preferably cardstock substrate of the wheel.

The wheels are assembled as by glueing, stapling or otherwise applying the similarly sized specimens to their respective cells on the cardstock, to form the middle layer of a nomograph 20, or the bottom layer of a nomograph 21. The first or viewing layer 22 is overlaid and both are punched to create a center hole 29, sized to receive a suitable pin 28. The pin is covered o one or both ends by the Velcro® tab. Then the assembled nomographs are attached by finger pressure on the center of the nomograph to releasably adhere the respective nomograph 20 or 21 to the substrate panel's mating spot 15. Thus the individual nomograph will stay in place, but it can be revolved for use.

All of the layers of an individual nomograph 20, 21 are preferably of the same diameter but need not be. A middle or inner layer can be of greater diameter than the upper (or lower) layer and still be rotatable.

Of course it is recognized that two sided nomographs such as 20 are reverse mounted for visual use of the lower layer. Thus the benefit of Velcro® tabs for mounting.

While it has been suggested that cardstock be used for the middle layer, this is based on cost efficiency. Any substrate such as plastic sheet, or metal such as aluminum sheet, or even heavy paper may be employed if desired.

Similarly, the viewing layer or first layer 22 has been indicated to be constructed preferably of plastic or cardstock which can be die cut purely for economic reasons. The first layer could be made of wood or metal as well.

While I have indicated that more than one element of the decorating scheme can be on any one nomograph, it is preferred that each nomograph be limited to that particular element of the decorating scheme. Thus reference is again made to FIGS. 4 and 5, wherein fabrics are to be covered in the unseen nomograph of FIG. 4 and paint colors are to displayed in the unseen nomograph of FIG. 5.

For operation, one merely lines up the basic color in what would be a key cell 45 by rotating the pointer 41, or the periphery of the wheel in question, or a handle member such as 170 if present, as may be easiest, to point arrow 42's tip 51 at cell 45 for the particular nomograph in question. Then the triad and complimentary colors and split complimentary colors are automatically aligned. This alignment procedure hold true for any and all middle layer wheels that can be assembled into nomographs.

Therefore in order to fully coordinate a room, one would use the invention 10 which would contain a plurality of these nomographs 20, 21. By first determining from a standard color wheel such as the Pantone color wheel, what basic color is desired as well as its compliment, split compliment and triad, one would then pick nomographs of the various room elements, e.g. rug colors and paint colors, and drapery fabrics, each of a particular manufacturer and carry out the coordination, by matching according to the 180 degree line, and the two aforementioned triangles 43 & 44 the various elements to achieve the desired decorator effect.

It is to be understood that there is not just one correct decorator effect to be achieved by use of this invention, but there is either a soothing coordinated effect or a terrible mismatch unpleasing to the eye effect. Thus a multiplicity of "correct" combinations can be achieved for the various elements forming the total decorator effect, each according to the taste of the individual. The tool of this invention just makes it easier to be correct.

The method to be employed herein is to utilize one nomograph for each aspect of the total decorating effect, and to choose one or more colors for that respective aspect from a visual inspection of the complimentary, split complimentary and triad of the basic color chosen for that particular aspect of the total decoration effect.

By having a plurlaity of nomographs all present in one structure, such as the previously noted, wall covering, fabric for chairs, trim paint, and rugs, the abilty to achieve a pleasing total decorator effect is easily accomplished. No longer will it be necessary to look at swatch after swatch of material to see if a certain sofa fabric goes with a desired wall color. It is all right there in front of you.

While I have recommended that the two principal layers of each nomograph be pinningly engaged to each other and then releasably secured to the substrate folder as by hook and loop fasteners, one or more of the nomographs can also be permanently secured to the substrate if desired.

Suitable substrate materials include cardstock, thin plywood, metal sheets and plastic sheets. Preferred material include cardstock due to cost and polyproplyene sheets, since a live hinge can be formed in the separate panels thereof as easily as in cardstock. Other materials would require a hinge such as a piano hinge to join the panels.

As noted in the drawings, one or more nomographs may be attached to separate panels of the substrate. Preferably each panel is separated from the next adjacent panel by a fold, or hinge in order to reduce the storage space necessary during periods of nonuse as well as for mailing of the kits.

It is seen that I have created a new and exciting apparatus and method for quickly and easily achieving a total decorator effect to the degree desired.

Since certain changes may be made in the above device and method without departing from the scope of the invention herein involved, it is intended that all matter contained in the above description, shall be interpreted as illustrative and not in a limiting sense.

I claim:

1. A coordination kit for choosing suitable fabrics, paints, wall coverings, window treatments, and the like to achieve a desired decorator effect, which kit includes at least two nomographs, each of which is mounted to a panel of a substrate, wherein each nomograph comprises at least two layers pinningly connected for independent rotation; a first rotatable upper layer having at least two windows, which upper layer overlies a lower layer having viewable segments, wherein each nomograph's upper layer is configured as a wagon wheel having a central hub, an outer peripheral member, an inner circular member spaced from the hub and spaced from the peripheral member, and at least two pairs of spokes each of which pairs is connected to the hub and to the circular member and the peripheral member, wherein the space between each pair of the at least two pairs of spokes is open thereby defining a window therebetween, the balance of the wagon wheel being closed off by filler sections, said upper layer being rotatable with respect to the lower layer, said lower layer being removably fixed to said substrate;

and wherein each of which segments has a plurality of cells, all of which cells contain a set of predetermined generally accepted color spectrum specimens, which specimens are used in the selection of the coordinated decorator effect desired.

2. The nomograph of claim 1 wherein at least two nomographs are releaseably mounted to the substrate by a releaseable mount system.

3. The kit of claim 1 wherein the specimens are from at least a portion of the entire color spectrum.

4. The kit of claim 3 wherein the specimens are photographic representations of tile, fabric, paint, rugs and other aspects of a room's decor.

5. The kit of claim 1 wherein the specimens are actual pieces of any and all of tile, window shade fabric, linoleum and other materials used in room decors.

6. The kit of claim 1 wherein the substrate has 2 panels, with a fold separating each panel.

7. The kit of claim 1 wherein the substrate has 3 panels with a fold separating each of the three panels.

8. The kit of claim 1 wherein the specimens of the cells of any nomograph differ from the specimens of the cells of any other nomograph.

9. The kit of claim 2 wherein the releasable mount system is a hook and loop fastener system.

10. The kit of claim 6 wherein each panel has one nomograph.

11. The kit of claim 6 wherein each panel has more than one nomograph.

12. The kit of claim 7 wherein each panel has one nomograph.

13. The kit of claim 7 wherein each panel has more than one nomograph.

14. In the kit of claim 1 wherein there are two pairs of spokes, and the space between each pair of the two pairs of spokes is open thereby defining two windows, the balance of the wagon wheel being closed off by filler sections.

15. In the kit of claim 14 wherein the two pairs of spokes are in opposed positions on the wagon wheel;

and further wherein the color spectrum specimens are circularly arranged such that only complimentary colors are visible through the two windows.

16. In the kit of claim 1 wherein there are three pairs of spokes, and the space between each pair of the three pairs of spokes is open thereby defining three windows, the balance of the wagon wheel being closed off by filler sections;

and further wherein the color spectrum specimens are circularly arranged such that only split complimentary colors are visible through the three windows.

17. In the kit of claim 16 wherein the three pairs of spokes which define the three windows are spaced equidistance from each other;

and further wherein the color spectrum specimens are circularly arranged such that only triad colors are visible through the three windows.

18. The kit of claim 1 wherein each nomograph includes at least one of a handle attached to a layer for easy rotation of one layer with respect to the other layer, and a pointer on the upper layer, and the releasable mounting means is a hook and loop system.

19. The kit of claim 1 wherein the combination of spokes and windows is placed such that all members of the group consisting of the complimentary colors, the split complimentary colors, and the triad colors are visible in the windows and the color specimens are so arranged to permit same.

20. The coordination kit of claim 1 wherein the lower layer of each nomograph is removably fixed to the substrate by a hook and loop mount system.

21. A coordination kit for choosing suitable fabrics, paints, wall coverings, window treatments, and the like to achieve a desired decorator effect, which kit includes at least two nomographs, each of which is releaseably mounted to a panel of a substrate by a releasable mounting means, wherein each nomograph comprises at least two layers pinningly connected for independent rotation, a rotatable upper circular layer configured as a wagon wheel having a hub and spokes, said kit having at least two non-adjacent windows, each of which windows is defined by a pair of spokes with a space therebetween, with a filler space between each pair of spokes not having a window closed off by a filler section;

which upper layer overlies a lower circular layer having viewable segments, each of which segments has a plurality of cells, wherein the cells are set out in circular bands of narrowing diameter on the lower layer with a plurality of cells on each band all of which cells contain a set of predetermined generally accepted color spectrum specimens, which specimens are used in the selection of the coordinated decorator effect desired, wherein the combination of spokes and windows is placed such that at least one member of the group consisting of the complimentary colors, the split complimentary colors, and the triad colors are visible in the windows and the color specimens are so arranged to permit same.

22. The kit of claim 21 wherein there are two upper layers, one above and one below an interposed lower layer, and wherein the lower layer is two sided, the above upper layer and the interposed lower layer each being rotatable with respect to the other.

23. The kit of claim 21 wherein each nomograph includes at least one of a handle attached to a layer for easy rotation of one layer with respect to the other layer, and a pointer on the upper layer, and the releasable mounting means is a hook and loop system.

* * * * *